Sept. 10, 1957  T. D. GRAYBEAL  2,805,912
HIGH SPEED RECORDING OSCILLOGRAPH
Filed Nov. 2, 1953  2 Sheets-Sheet 1

INVENTOR.
TROY D. GRAYBEAL.
BY
Willard S. Gwinn
ATTORNEY.

Sept. 10, 1957 T. D. GRAYBEAL 2,805,912
HIGH SPEED RECORDING OSCILLOGRAPH
Filed Nov. 2, 1953 2 Sheets-Sheet 2
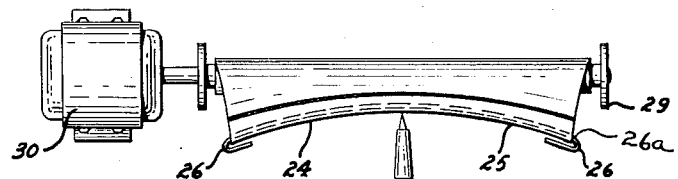
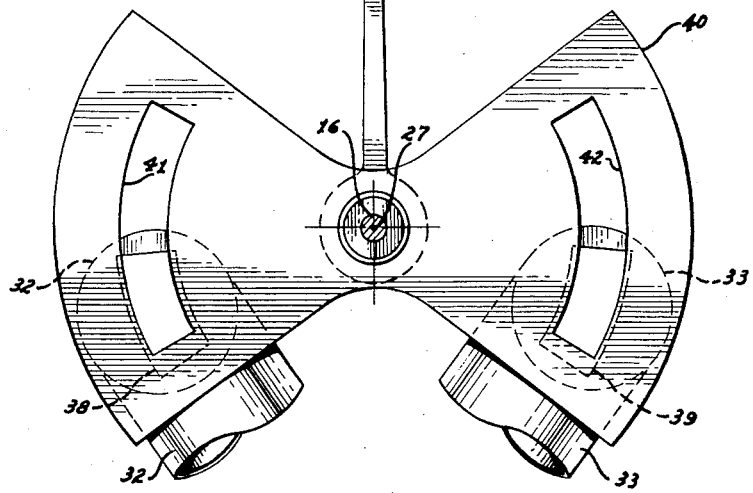
Fig. 3
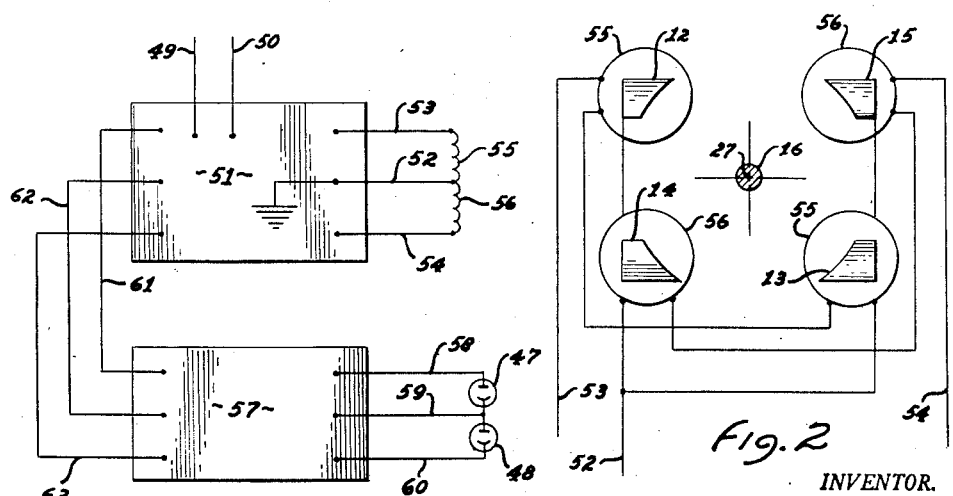
Fig. 4
Fig. 2
INVENTOR.
TROY D. GRAYBEAL.
BY
Willard S. Grove
ATTORNEY.

United States Patent Office 2,805,912
Patented Sept. 10, 1957

2,805,912

HIGH SPEED RECORDING OSCILLOGRAPH

Troy D. Graybeal, Phoenix, Ariz.

Application November 2, 1953, Serial No. 389,697

2 Claims. (Cl. 346—32)

This invention pertains to improvements in recording instruments and is particularly directed to an improved high speed recording oscillograph.

Heretofore it has been difficult to provide an oscillograph record of permanent character which was sufficiently responsive to high frequencies of movement of the recording device on the chart record.

It is therefore one of the objects of this invention to obtain a high speed of response for the recording oscillograph so that the device may be used to record much higher frequencies than has heretofore been possible in prior recorders and direct writing oscillographs.

It is a further object of this invention to provide an improved high speed recording oscillograph which is capable of providing a chart record which is a true rectangular co-ordinate plot of the data to be recorded.

Still another object of this invention is to provide an improved high speed recording oscillograph which is operated by means of a direct acting high torque low inertia driving motor which actuates the writing arm or beam.

Still another object of this invention is to provide an improved high speed recording oscillograph in which the calibration is obtained by using a beam displacement measuring device which produces an output signal directly proportional to the displacement or angular position of the writing or recording beam. This signal is compared with the input signal being measured or recorded by means of suitable feedback apparatus of conventional design and the difference signal is used to actuate the driving motor through a suitable amplifier.

It is still another object of this invention to provide in an improved high speed recording oscillograph an arrangement wherein the angular displacement of the writing beam may be measured by a photoelectric system consisting of a light source and variable slits co-operating with the light source which control the light applied to photoelectric cells to measure the total light passed by the slits. In this arrangement the over-all calibration, the light source, is preferably regulated by a feedback device which maintains the sum of the outputs of the two photoelectric cells constant, such a regulating device making use of conventional circuits well known in the prior art such as shown in patents of Wilson et al. 1,930,496 and Sipman 2,365,601. This type of beam displacement measuring device has the advantage of requiring no spring connections or sliding contacts on the moving shaft.

Further features and advantages of this invention will appear from a detailed description of the drawings in which:

Fig. 2 is a section on the line 2—2 of Fig. 1.

Fig. 3 is a section on the line 3—3 of Fig. 1.

Fig. 4 is an elemental circuit diagram of the essential electrical connections to the recording oscillograph.

Figure 1:
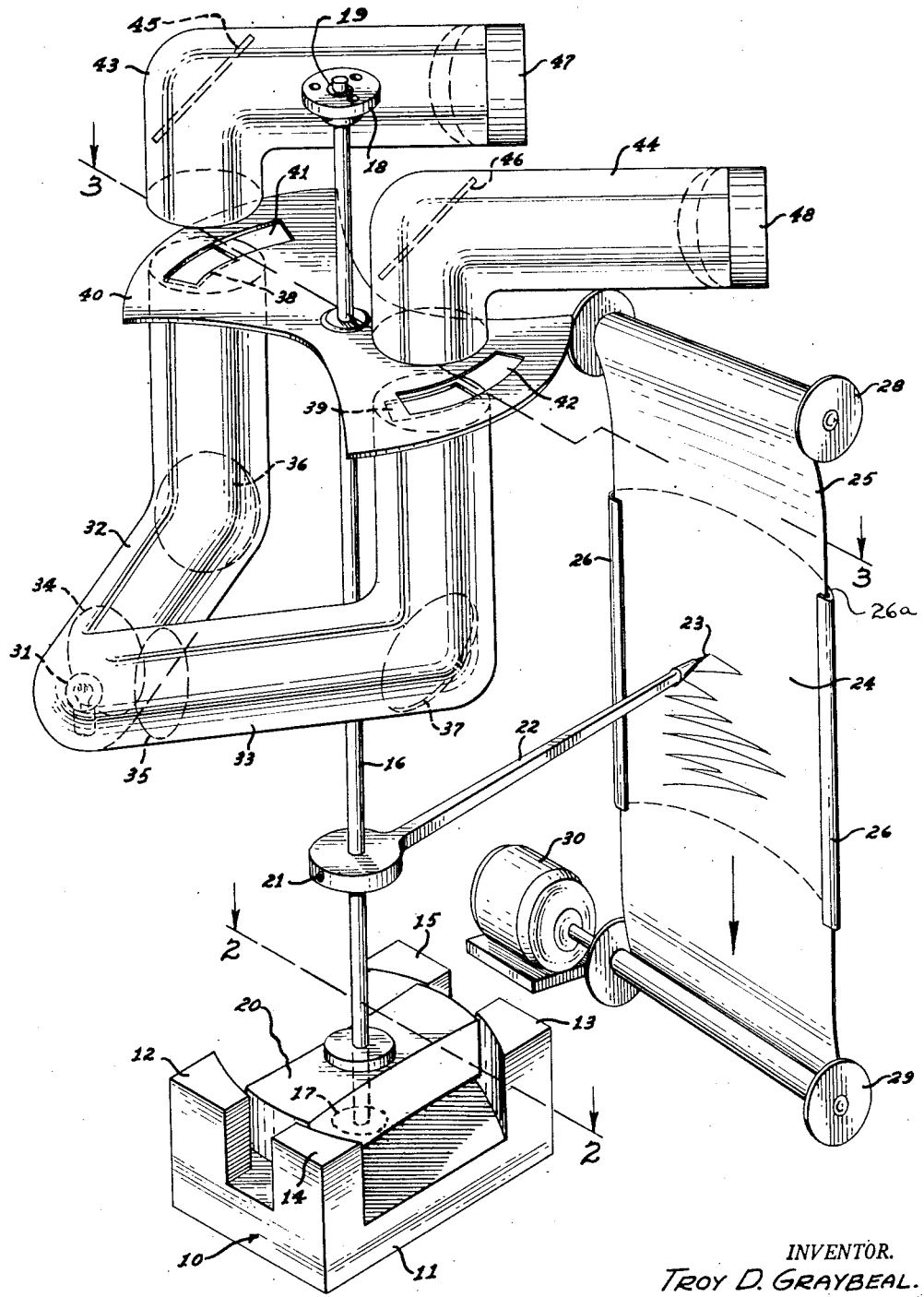
Fig. 1 is a general diagrammatic view showing a high speed recording oscillograph incorporating the features of this invention.

As exemplary of one embodiment of this invention there is shown a high speed recording oscillograph having a beam actuating motor indicated generally at 10 comprising a base 11 and magnetic pole pieces 12, 13, 14 and 15 secured to the base 11. The beam carrying shaft 16 is journaled in a suitable thrust bearing 17 in the base 11 and is supported at its upper end in a suitable support 18 in a bearing 19 in said support 18. Fixed on the shaft 16 is the magnetic armature 20 of the motor 10.

Fixed on the shaft 16 by suitable means such as the setscrew 21 is the recording beam 22 which has mounted on its outer end a suitable stylus 23 which may take the form of a pencil lead or inking pen.

The stylus 23 is arranged to contact the arcuate surface 24 of a longitudinally moving chart 25 which is supported in a suitable guide means 26 on the chart support member 26a so that the surface 24 of the chart 25 is held in its arcuate shape at an equal radial distance from the axis of rocking movement 27 of the shaft 16 so that the stylus 23 may swing back and forth in recording contact with the surface 24 of the chart 25. Suitable reels 28 and 29 properly support and supply the chart to the chart support member 26a as the chart is driven by the chart drive motor 30.

The angular displacement of the writing beam may be measured by a photoelectric system consisting of a light source 31 which is transmitted through the lower light tubes 32 and 33 by means of lenses 34 and 35 suitably mounted respectively in the tubes 32 and 33 as best seen in Fig. 1. Light then engages the angular mounted mirrors 36 and 37 from which the light from the tubes 32 and 33 are projected axially of the shaft 16 out through slits 38 and 39 respectively in the ends of the tubes 32 and 33.

Immediately above the slits 38 and 39 mounted in fixed position on the shaft 16 is the vane 40 which in turn has arcuate slots 41 and 42 co-operating with the slots 38 and 39 and the light tubes 32 and 33 so that the light transmitted through the slots 41 and 42 varies in direct proportion to the angular displacement and rotation of the shaft 16 and the vane 40 for either direction of rotation.

Directly above the slots 41 and 42 in the control vane 40 are the light receiving tubes 43 and 44 which have light receiving mirrors 45 and 46 which discharge light to the photoelectric cells 47 and 48.

The general arrangement of the electrical circuit connections to the device is shown in Fig. 4. The input signal to be recorded is received from the lines 49 and 50 which are connected to a suitable amplifier 51. The output from the amplifier is connected through leads 52, 53 and 54 to the coils 55 and 56 for energizing the pole pieces 12, 13, 14 and 15 of the beam actuating motor 10. The feedback control from the photoelectric cells 47 and and 48 is connected through a compensating network 57 by the leads 58, 59 and 60 through the leads 61, 62 and 63 to the amplifier 51.

Thus, as the incoming signal is applied through the amplifier to the motor 10 the recording beam 22 and the stylus 23 move in an arcuate path transverse to the chart 25 while the chart is actuated in longitudinal movement by the chart drive motor 30 which is preferably energized at some time interval or other specific data to be coordinated with the path of travel of the stylus 23.

The magnetic type drive motor 10 shown requires no connection to the moving system such as the shaft 16 and recording beam 22. The 4 magnetic poles shown are energized in pairs in order to maintain a torque balance in the forces applied to drive the moving system. This minimizes a tendency for vibration which would not be achieved if unbalanced forces were used to produce the driving torque for the shaft 16. It is understood the whole moving system is carefully dynamically balanced to achieve maximum frequency of response.

There has thus been produced a high speed recording oscillograph which may reproduce at high frequencies a permanent record chart for future reference.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention what is claimed and desired to be obtained by United States Letters Patent is:

1. A high speed recording oscillograph having, a beam actuator motor, magnetic pole pieces in said motor, a vertical shaft, a magnetic armature fixed on said shaft and located in said magnetic field produced by said pole pieces, a horizontal recording beam fixed on said shaft, a stylus on the outer end of said beam having a scribing point traveling in a transverse arcuate path about the axis of said shaft, a chart, means for moving said chart vertically longitudinally parallel to said axis of said shaft, a chart support for holding said chart in the arcuate path of travel of said stylus point, a chart drive motor for actuating said chart in longitudinal movement, a single light source, a pair of photoelectric cells, a pair of fixed spaced slot means in front of said light source, a horizontal vane fixed on said shaft, a pair of slot means in said vane aligned with each of the slot means in front of said light source, means for transmitting said light from said slot means to energize said photoelectric cell means, an amplifier, means for connecting the signal to be recorded to the input of said amplifier, means connecting the output of said amplifier to energize said beam actuating motor, and means to connect said photoelectric cell means to provide a feedback control of said motor.

2. In a high speed recording oscillograph, an electromagnetic beam actuating torque motor having a vertical shaft, a magnetic armature fixed on said shaft, pairs of pole pieces on a base, coils around said pole pieces, an amplifier having its output connected to energize said coils, means for connecting the signal to be tested to the input of said amplifier, said pole pieces and coils being so arranged as to be energized in pairs to maintain a torque balance in the forces applied to drive said armature and shaft, a horizontal radially disposed recording beam fixed on said shaft, a stylus on the outer end of said beam, a chart, a vertically disposed chart support arranged to hold said chart in transverse arcuate position coinciding with the arcuate path of travel of said stylus, drive means for actuating said chart in longitudinal movement, feedback means connected to said amplifier actuated by the movement of said shaft, said feedback means including, a horizontal vane fixed on said shaft, a pair of arcuate slots in said vane, a single source of light, a pair of fixed arcuate slots in front of said source of light arranged in alignment with said slots in said vane, and a pair of photoelectric cells, one for each of said slots in said vane, positioned to receive light from said source coming through the slots in said vane so as to provide an output signal directly proportional to the angular displacement of said shaft rotation and beam.

References Cited in the file of this patent
UNITED STATES PATENTS

| | | |
|---|---|---|
| 1,680,756 | Winter | Aug. 14, 1928 |
| 1,930,496 | Wilson et al. | Oct. 17, 1933 |
| 2,065,421 | Bernarde | Dec. 22, 1936 |
| 2,365,601 | Sysman | Dec. 19, 1944 |
| 2,505,420 | McCrary et al. | Apr. 25, 1950 |
| 2,530,868 | Garceau | Nov. 21, 1950 |
| 2,606,093 | Reason | Aug. 5, 1952 |